Patented Dec. 4, 1951

2,577,076

UNITED STATES PATENT OFFICE 2,577,076

PURIFICATION OF BENZHYDRYL ETHERS

Elwood H. Ensor, Wilmette, and John H. Speer, Morton Grove, Ill., assignors to G. D. Searle & Co., Skokie, Ill., a corporation of Illinois No Drawing. Application September 17, 1947, Serial No. 774,682

3 Claims. (Cl. 260—570)

This invention relates to processes for purifying dialkylaminoalkyl benzohydryl ethers and to new compositions of matter employed in such processes. In particular it relates to processes of purifying beta-dialkylaminoalkyl benzohydryl ethers by means of their crystalline citrates.

The dialkylaminoalkyl benzohydryl ethers and salts thereof are used in medicine as antispasmodic and antihistaminic drugs. In particular, beta-dimethylaminoethyl benzohydryl ether is a therapeutic agent of great interest and extensive use. It is widely used in medicine under the name diphenhydramine for the treatment of allergic manifestations, especially those relating to hay fever, asthma, urticaria, and allied conditions. It is manifest that these synthetic drugs must be produced in a state of high purity for use in medicinal formulations. In the commercial preparations of dialkylaminoalkyl benzohydryl ethers there is, however, a relatively large amount of neutral impurity. This impurity is very difficult to remove because a large part of it distils in the same range as the lower dialkylaminoalkyl benzohydryl ethers. Extraction methods of purification are complicated and costly, and crystallization of the usual salts of dialkylaminoalkyl benzohydryl ethers is inefficient and expensive.

It is the object of this invention to provide simple, inexpensive and efficient processes of purifying crude commercial dialkylaminoalkyl benzohydryl ethers. It is a further object of this invention to provide simple processes of producing pure crystalline citrates of dialkylaminoalkyl benzohydryl ethers. It is still another object of this invention to provide efficient methods of purifying dialkylaminoalkyl benzohydryl ethers by formation of the citric acid salts of said ethers and recrystallization of said salts from readily available solvents.

We have discovered that dialkylaminoalkyl benzohydryl ethers may be purified simply and efficiently by conversion of the crude material to the corresponding citrates, which, contrary to expectation based on the general behavior of citrates of complex amines, are of unusually low solubility in cold water and many water-soluble organic solvents. This enables one to precipitate a dialkylaminoalkyl benzohydryl ether from a crude preparation thereof by means of its crystalline citrate. The salt thus obtained may be washed with water or an organic solvent for additional purification, and the pure salt thus obtained may be used as such in therapeutic preparations or may be converted by treatment with bases to the purified dialkylaminoalkyl benzohydryl ether.

The dialkylaminoalkyl benzohydryl ether citrates may be prepared by reacting the bases with citric acid, with or without solvents. These processes may be carried out by the usual technics of synthetic organic chemistry. In practice we have found it desirable to use as solvents for this purpose, water or the common neutral organic liquids. Generally we prefer to use solvents that aid in the purification of the salts. Among such solvents we have found that water and neutral water-miscible organic solvents are excellent. Particularly effective are the lower alcohols such as methanol, ethanol, isopropanol, propanol and the like. Dioxane and water-soluble ketones such as acetone and methyl ethyl ketone are also efficient solvents. The foregoing solvents and mixtures thereof assist in the purification of the desired citrates by removing extraneous material after the salt has crystallized out. Mixtures of water and water-insoluble organic solvents, including ethyl acetate, carbon tetrachloride, dibutyl ether, diethyl ether and benzene, toluene, and other hydrocarbons are also satisfactory media for the preparation and subsequent crystallization of the citrates.

The relative amounts of citric acid in relation to the amount of dialkylaminoalkyl benzohydryl ether may vary over fairly wide ranges, although we have discovered that the most efficient processes utilize approximately 1.1 mole of citric acid per mole of organic base. Larger excesses of citric acid are not undesirable except as they affect the costs of the processes. It is often feasible to use equivalent amounts of citric acid and basic ether, particularly if a water-insoluble solvent is used as reaction medium.

The purification of the dialkylaminoalkyl benzohydryl ether citrates is conveniently effected by recrystallization. It is often advantageous to carry this out in the solvent in which the preparation of the salt was carried out. For this reason it is therefore desirable to prepare the salt in a solvent wherein the salt is only slightly soluble. In such cases, the salt begins to crystallize out soon after it is formed from the basic ether and the citric acid. It can then be separated from the mother liquor, which contains the impurities. Further washings with water or organic solvents assist the purification.

Our purification methods are not dependent upon the method by which the dialkylaminoalkyl benzohydryl ether citrates are made. These salts can be made without the use of a solvent or they can be made in any of the available neutral organic solvents or in water or in mixtures of these substances. However obtained, the citrates can be crystallized from water or from neutral water-miscible organic solvents or from mixtures of the same. For practical reasons it is preferable to prepare the citrate in a suitable crystallization medium of the type disclosed herein.

Water is an excellent solvent for the crystallization of citrates of dialkylaminoalkyl benzohydryl ethers. These salts are readily soluble in hot water but only slightly soluble in water at ordinary temperatures. The solubility of beta-dimethylaminoethyl benzohydryl ether citrate, for example, is approximately 1.4% in water at 20° centigrade. In water at 90° C. the solubility of this salt is very great, being of the order of 50%. This range of solubilities of this salt allows efficient recrystallization from water. The extremely low solubility of the salt at ordinary temperatures makes possible the continued washing of the citrate with water with very little loss of material. The crystalline form of the citrate causes the formation of a porous cake such that washing with water not only removes water-soluble impurities but also under certain circumstances entrains water-insoluble oily contaminants and carries them away mechanically. The solubility of beta-diethylaminoethyl benzohydryl ether citrate is approximately 5% at 30° C. and about 50% at 90° C. This solubility range allows for efficient crystallization of the salt from water.

Our invention is further disclosed by the following examples, which are intended only as illustrations and which in no way limit the invention in spirit or scope. The amounts of materials are given in parts by weight.

*Example 1*

10 moles of beta-dimethylaminoethyl benzohydryl ether (85% pure) are dissolved in an equal volume of warm isopropanol. 10 moles of citric acid are dissolved in the minimum amount of hot isopropanol. The warm solutions are thoroughly mixed and allowed to stand. The precipitation of beta-dimethylaminoethyl benzohydryl ether citrate starts within a few minutes and is generally complete within several hours. The crystalline salt is collected on a filter and washed thoroughly with a small amount of isopropanol, followed by larger amounts of water. The crystalline salt is then recrystallized from hot water, collected again on a filter, and washed several times with cold water. The purified beta-dimethylaminoethyl benzohydryl ether citrate thus obtained melts at 151° C. and assays at least 99% pure. Analysis shows its formula to be $(C_6H_5)_2CHOCH_2CH_2N(CH_3)_2 \cdot$
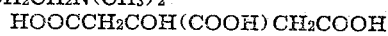
$HOOCCH_2COH(COOH)CH_2COOH$ If the organic base in pure form is desired, the purified citrate is suspended in several volumes of water and made alkaline with 15% sodium hydroxide solution. The oily beta-dimethylaminoethyl benzohydryl ether which separates is removed and dried. The organic base obtained in this manner has a purity of 97–100%, depending upon the assay of the salt.

*Example 2*

140 parts of beta-dimethylaminoethyl benzohydryl ether (85% purity) are dissolved in 100 parts of toluene. The resulting solution is added to a solution of 105 parts of citric acid in 450 parts of hot water (75° C.). The mixture is agitated thoroughly for a few minutes, then allowed to separate into two phases. The water layer is drawn off, agitated with decolorizing charcoal, filtered while hot, and then chilled. A heavy precipitate of beta-dimethylaminoethyl benzohydryl ether citrate forms (182 parts). This is filtered and washed thoroughly with water. The salt is suspended in about 500 parts of water and made alkaline with 15% sodium hydroxide solution. The organic base which separates is drawn off and dried. A yield of 93 parts of beta-dimethylaminoethyl benzohydryl ether is obtained as a light-colored liquid of purity at least 96%.

The hot aqueous solution of beta-dimethylaminoethyl benzohydryl ether citrate, after separation from the toluene layer, may be further extracted with an organic solvent such as toluene. Furthermore, the crystalline citrate obtained after chilling the aqueous solution may be recrystallized from water to attain a high degree of purity. Other organic solvents than toluene may be used for extracting the water-insoluble impurities, among them being petroleum fractions of boiling range 80–150° C.; and water-immiscible organic solvents such as higher ethers and esters boiling in this range are suitable.

*Example 3*

510 parts of crude, wet beta-dimethylaminoethyl benzohydryl ether (of 80–85% purity) are dissolved in 400 parts of isopropanol. To this solution is added a solution of 422 parts of citric acid in 750 parts of isopropanol. The reaction mixture is heated with steam for 15 minutes, during which time the temperature reaches 60° C. It is then chilled and filtered. The filter cake of the citrate is washed thoroughly with cold water and then dried at 60–65° C. for 15 hours. The yield of salt thus obtained is 725 parts. It melts at 142–144° C.

450 parts of beta-dimethylaminoethyl benzohydryl ether citrate prepared above are dissolved in 1500 parts of hot water. The hot solution is agitated with 15 parts of carbon black, filtered and then cooled to 43° C. The precipitated salt is collected on a filter and washed with 150 parts of cold water. It is then dried at 60–65° C. to constant weight (yield, 296 parts). The citrate obtained in this manner melts at 148–149° C.

*Example 4*

2 parts of beta-diethylaminoethyl benzohydryl ether are added to a warm solution of 2 parts of citric acid in 8 parts of isopropanol. The resulting solution is warmed for a few minutes and stirred, whereupon a heavy precipitate of the citrate crystallizes out. This is collected on a filter, washed with isopropanol and then with ether, and dried at 60–65° C. for several hours. It is readily soluble in hot water and may be recrystallized therefrom, and when so purified melts at 120–121° C. At 30° C. this salt is soluble in water to the extent of 3.6 g. per 67.8 g. of water (about 5%). Analysis shows its formula to be $(C_6H_5)_2CHOCH_2CH_2N(C_2H_5)_2 \cdot$
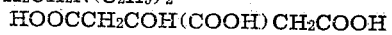
$HOOCCH_2COH(COOH)CH_2COOH$

*Example 5*

200 parts of citric acid are dissolved in 2000 parts of warm water. To the clear solution are added 232 parts of impure beta-dimethylaminoethyl benzohydryl ether (assay, 93%). The mixture is stirred and cooled. Within a few minutes the citrate begins to precipitate and is centrifuged after the temperature has dropped to 30–35° C. The material in the centrifuge is washed thoroughly with cold water, then with 400 parts of isopropanol, followed by more cold water. The purified citrate so obtained is then converted to the base by suspension and agitation in a solution of 120 parts of caustic soda in 200 parts of water. The beta-dimethylaminoethyl benzohydryl ether is drawn off and dried. The recovery of base by this procedure is 85–90% and the product thus obtained assays 98–99%.

*Example 6*

A series of experiments using 10 parts of citric acid in 30 parts of a water-soluble solvent selected from the following series is carried out. To a solution of acid is added 12 parts of beta-dimethylaminoethyl benzohydryl ether. The mixture is stirred and allowed to warm up due to heat of reaction. After cooling to 30° C. the crystalline citrate is removed by filtration, washed thoroughly with 35 parts of solvent and twice with 200 parts of water, and dried. The following results are obtained:

| Solvent | Yield of Citrate | Melting Point |
|---|---|---|
| | *Parts* | ° *C.* |
| Methanol | 8 | 148–149 |
| Acetone | 14.1 | 148–149 |
| Ethanol | 12.6 | 148–149 |
| Water | 17.5 | 145–147 |
| Isopropanol | 16.2 | 148–149 |
| Dioxane | 8.5 | 147 |
| 2-Butanone | 9.2 | 148–149 |

We claim:

1. The process for purifying a dialkylaminoethyl benzohydryl ether wherein the alkyl groups contain a total of not more than 4 carbon atoms which comprises forming the citric acid salt of said ether, crystallizing said salt from water and converting said purified salt to purified dialkylaminoalkyl benzohydryl ether.

2. The process of purifying $\beta$-dimethylaminoethyl benzohydryl ether which comprises forming the citric acid salt of said ether, crystallizing said salt from water and converting said purified salt to purified $\beta$-dimethylaminoethyl benzohydryl ether.

3. The process of purifying beta-dimethylaminoethyl benzohydryl ether which comprises reacting said ether with citric acid in isopropanol, collecting the insoluble citrate, recrystallizing said citrate from water, washing and drying the same, and converting said purified citrate to purified beta-dimethylaminoethyl benzohydryl ether by reaction with aqueous bases.

ELWOOD H. ENSOR.
JOHN H. SPEER.

REFERENCES CITED

The following references are of record in the file of this patent:

UNITED STATES PATENTS

| Number | Name | Date |
|---|---|---|
| 2,397,799 | Martin | Apr. 2, 1946 |
| 2,421,714 | Rieveschl | June 3, 1947 |
| 2,427,878 | Rieveschl | Sept. 23, 1947 |
| 2,437,711 | Rieveschl | Mar. 16, 1948 |